April 15, 1952      G. P. SANDERSON      2,593,348
CURRENT PRODUCTION, SALES, INVENTORY OR LIKE INDICATOR Filed Dec. 28, 1948      3 Sheets-Sheet 1

INVENTOR
George P. Sanderson
BY
ATTORNEY.

April 15, 1952     G. P. SANDERSON     2,593,348
CURRENT PRODUCTION, SALES, INVENTORY OR LIKE INDICATOR
Filed Dec. 28, 1948     3 Sheets—Sheet 2
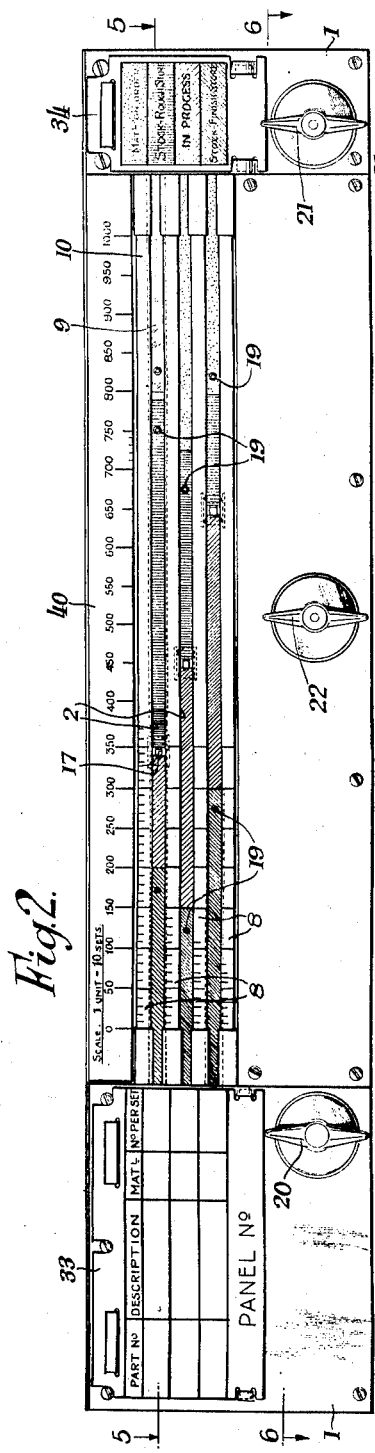
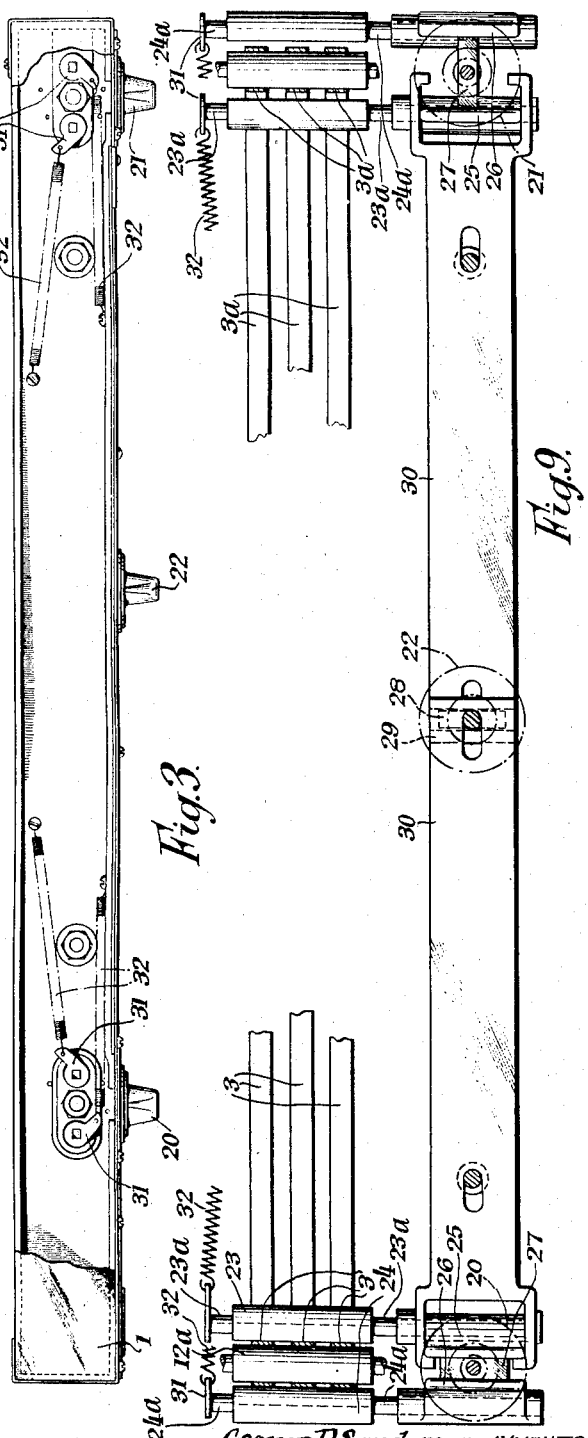
George P. Sanderson, INVENTOR;
ATTORNEY

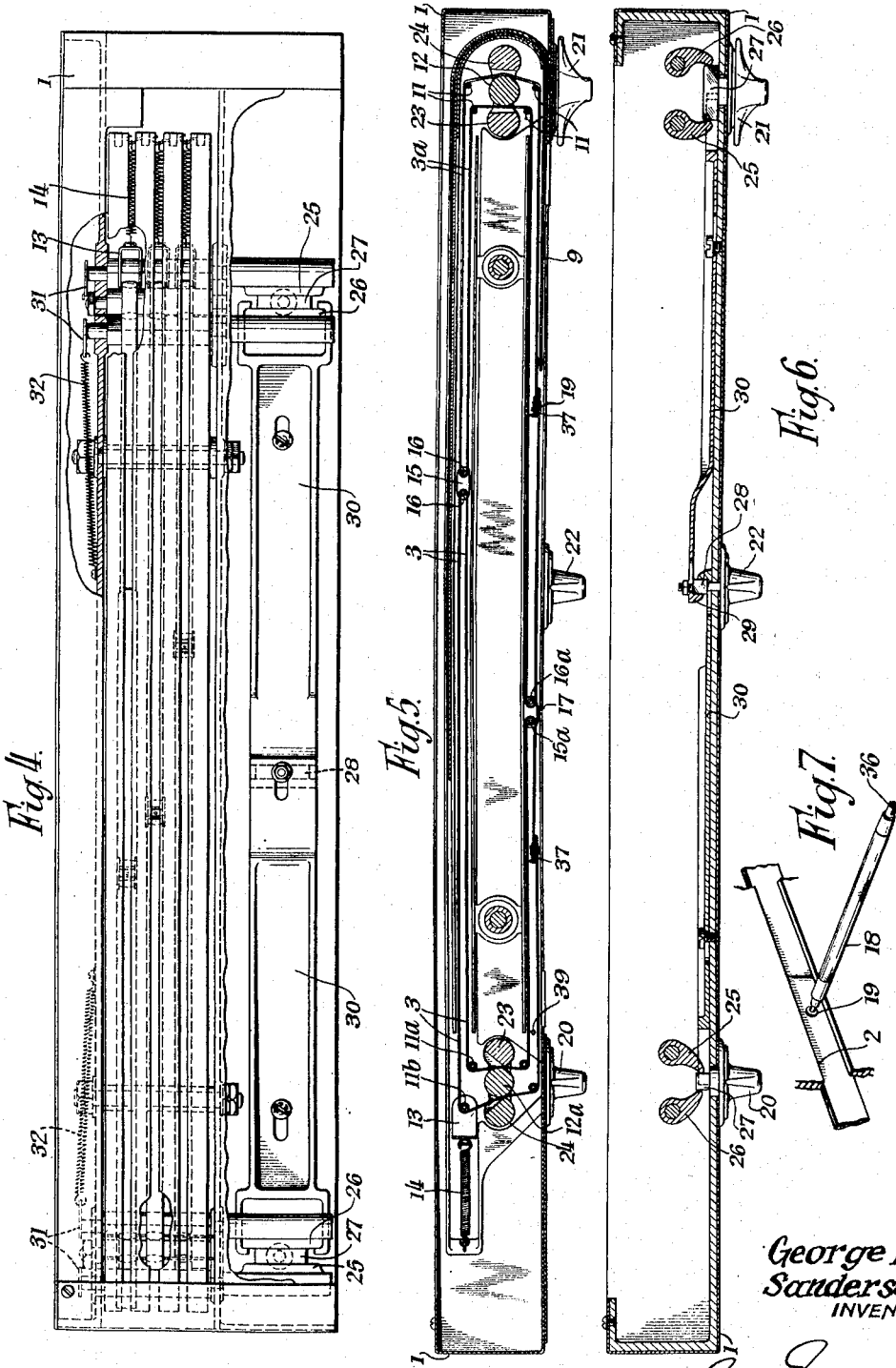

UNITED STATES PATENT OFFICE 2,593,348

CURRENT PRODUCTION, SALES, INVENTORY, OR LIKE INDICATOR

George Percival Sanderson, London, England

Application December 28, 1948, Serial No. 67,687
In Great Britain October 16, 1947

12 Claims. (Cl. 116—135)

This invention relates to charts or indicators of the kind generally known as bar charts in which a series of bars of various colors may be built up to represent pictorially or graphically the details of output or other information relating to a commercial, industrial or other concern, which details may vary from day to day. Such details may relate, for example, to daily production, sales, available material and the like which may be pictorially represented on a chart so that any situation that may arise may be instantly appreciated and the appropriate action taken.

Such bar charts at present in use comprise panels which have regularly arranged rows of holes or slots for the reception of colored pegs or tabs to form bars of different colors and lengths to indicate the required details. These pegs or tabs have to be regularly inserted or removed in accordance with the variation of details to be indicated which involves a certain amount of intricate work and at the same time does not allow the length of a bar to be adjusted by an amount less than one peg or tab.

The object of the present invention is to provide a bar chart which can be accurately adjusted without the necessity for intricate work.

A chart or indicator according to the present invention for the purpose of giving pictorially details of output or other information relating to a commercial, industrial or other concern comprises a casing or support carrying a plurality of individually and differently colored or marked strips or tapes co-operating with a fixed linear scale, the individually colored or marked parts of the strips being capable of exposure to a predetermined degree as indicated by the fixed scale so that the length of each exposed colored or marked part will give a visual indication of individual details of information sought.

Although it is within the scope of the present invention to employ a plurality of strips or tapes which are linearly fixed and are exposable to a predetermined degree by the provision of suitable obturator strips or members, it is preferred that each strip or tape shall comprise a flexible endless chain or loop and that each strip shall be linearly movable so that the appropriate length of coloured or otherwise marked section or sections of each tape will be visible through a slot-like sight window in the front of the apparatus.

In order that the invention may be clearly understood and readily carried into effect the invention is hereinafter described with reference to the accompanying drawings in which:

Figure 2 illustrates the same, only three bars being shown for convenience of illustration;

Figure 3 is a plan view of the bar chart illustrated in Figure 2 the casing of the instrument being broken away to show parts of the internal mechanism;

Figure 4 is a rear elevation of the bar chart, the casing being again broken away to illustrate the internal construction;

Figure 5 is a section on the line V—V in Figure 2;

Figure 6 is a further sectional view on the line VI—VI in Figure 2;

Figure 7 is a fragmentary perspective view illustrating a preferred method of operation;

Figure 9 is a front elevation of the internal mechanism.

Figure 1:
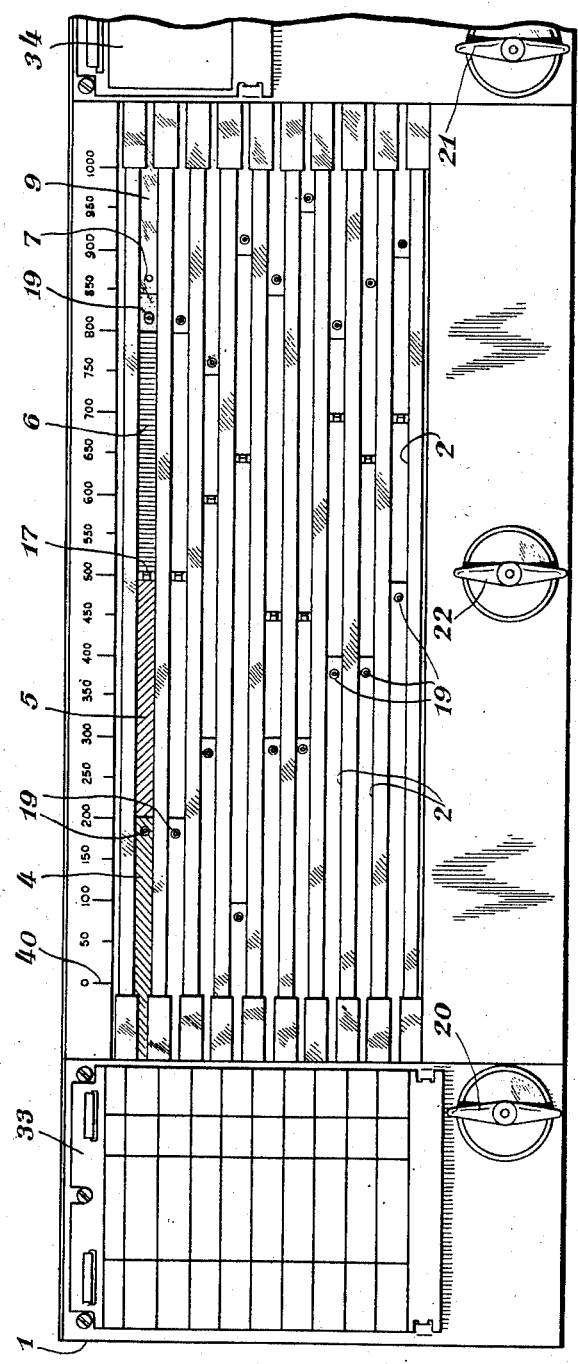
Figure 1 illustrates the bar chart in front elevation.

In the construction illustrated the chart or indicator hereinafter referred to in the detailed description as a bar chart comprises a rectangular casing 1 formed with a plurality of parallel longitudinally arranged slot-like sight windows 2 behind each of which windows is mounted two flexible fabric or other strips each in the form of a closed loop, the loops being indicated by reference numerals 3 and 3a, each loop being divided into two lengths or sections of contrasting color or marking. Referring for the moment to Figure 1 and considering the uppermost sight window this sight window discloses sections indicated by reference numerals 4, 5, 6 and 7 which are respectively colored red, blue, green and yellow. As will be seen clearly in Figures 2 and 2a, the casing is provided with a series of standard scales 8 which for convenience are calibrated from 0 to 100 and it will be seen that these index scales provide a visual and accurate indication of the effective length of each colored section which is exposed in each sight window. In addition the casing carries a readily replaceable master scale 40 referred to later on in this description. An opaque obturator 9 is also provided for a purpose hereinafter referred to in connection with the operation of the instrument.

The tape comprising the two closed loops 3 and 3a is linearly slidable in guide members 10 which are conveniently moulded from a suitable mouldable plastic or synthetic resin and are provided with oppositely positioned longitudinally arranged grooves for the reception of the tape.

The guide members are so formed that the tape at the right hand end of the instrument passes over four fixed guide rollers 11 and passes on opposite sides of a fixed post 12 (see Figure 5). On the left hand side of the instrument the tape comprising the opposite loop passes over three fixed guide rollers 11a and on opposite sides of fixed post 12a and over a fourth roller 11b which is carried by a bracket 13 which is spring loaded by means of a coiled spring 14 to maintain both loops taut.

Both loops are connected at the front and back of the instrument by means of floating links 15 and 15a which in turn carry rollers 16 and 16a over which the loops pass freely.

Figure 8:
Figure 8 is a longitudinal section drawn to an enlarged scale illustrating a constructional detail.

The form of the front floating link 15a is illustrated clearly in Figure 8 the link including a transverse bar 35 having an upturned edge 17 the bar being colored or marked to correspond with the colored or marked tape section 5 immediately to the left of the link of which it visually forms a part. Each loop comprises a single length of tape divided into two sections of contrasting colors or markings, the free ends of each tape being connected by means of a clip 37 which is bent up from sheet metal into the form shown in Figure 8 an eyelet or tubular rivet 19 being passed through the clip and tape ends to clamp the tape ends firmly between the parts of the clip. The clip is so formed that it can be moved into the chain dotted position in which it overrides the bar 35 and engages the upturned edge 17 in which position the colored or otherwise marked bar will be hidden from view, tape section 5 being in that case not visible through the sight window. The upturned edge 17 in addition to forming a stop for the clip 37 is also engageable by a slot 36 in one end of an operating stylus 18 (see Figure 7) the opposite end of the stylus being reduced in diameter to enter the eyelet 19. In this way the appropriate end of the stylus will be engaged with the parts 17 or 19 and the link moved laterally or the tape moved linearly. The clip 37 is formed with a rearwardly directed projection 38 which when the clip is in the chain dotted line position indicated on the left of Figure 8 corresponding to the terminal position of the tape towards the left, engages a fixed stop 39 in the casing in which position no part of section 4 will be visible in the sight window.

To adjust the position of the tapes and expose the required lengths of colored sections in collaboration with the fixed scales the pointed end of the stylus is, for example, inserted in the left hand eyelet 19. If the tape is thereby drawn towards the right more of section 4 will be exposed in the sight window and less of section 5. If on the other hand the opposite end of the stylus is engaged with part 17 and the stylus and its associated link drawn to the right an increased length of section 5 will be exposed leaving the original length of section 4 exposed. It will be appreciated that in the first case the tape will have been moved linearly with respect to the sight window, whereas in the second case only the link will have been moved linearly of the sight window.

It will be appreciated, therefore, that any adjustment of the tape linearly must not result in linear movement of the link and vice versa, and with this object in view locking mechanism is provided on the instrument to prevent such undesired movement. The instrument carries at the front three hand actuated locking knobs or equivalent members, the two outside locking knobs 20 and 21 serving to prevent undesired linear movement of the left and right hand tapes with respect to the sight window, but permitting of lateral movement of the link 15a on the third central knob 22 being moved to its unlocked position. Conversely assuming that knob 22 is in its locking position either knob 20 or 21 can be moved into its unlocking position to permit of linear movement of its associated tape without linear movement of the other tape or lateral movement of the link taking place.

One method of effectively locking the tapes against linear movement and the link 15a against lateral movement is illustrated in the accompanying drawings and in the arrangement shown, each tape is gripped between two part circular members 23 and 24 and the fixed post 12 or 12a, the members 23 and 24 being capable of angular movement about their axes individually or collectively. Members 23 and 24 are rigidly associated with the pawl-like members 25 and 26 respectively which are movable into diverging relationship by means of cams 27 associated with knobs 20 and 21. Assuming, therefore, that knob 21 is moved into a position in which its associated cam moves members 25 and 26 into diverging relationship (see Figures 5 and 6), the right hand components 23 and 24 will be moved angularly out of gripping engagement with the flexible tape as shown on the right hand side of Figures 5 and 6 and consequently the tape comprising the right handclosed loop can be moved linearly with respect to the sight window by inserting the stylus in the appropriate eyelet hole. Assuming that knob 20 is in its locking tape gripping position there will be no risk of lateral displacement of the links 15 or 15a. To enable the front link 15a to be displaced laterally and linearly of the sight window knobs 20 and 21 are turned to their locking positions. Knob 22 is then turned into a horizontal unlocking position, this knob being fitted with a cam 28 which co-operates with projections 29 on two oppositely directed sliding bars 30 which in turn engage parts 25 at opposite ends of the instrument. In Figure 6 the knob 22 is shown in its locking position, but on the knob being turned through a right angle the parts 30 will be moved in an opposite direction to bring about consequential opposite angular movement of parts 25 and associated members 23 to release the inner part of each loop, thus permitting link 15a to be moved laterally any predetermined amount to expose the required length of colored tape sections on opposite sides of the link 15a. To maintain normally the grip on the tapes, parts 23 and 24 carry arms 31 to which are attached coiled springs 32 anchored at convenient points to the casing.

As shown clearly in Figure 2 the casing of the instrument on the left hand side of the sight windows carries a replaceable card 33 bearing the part number, description and other information relative to a particular article to which each window refers and on the right hand side a color chart 34 is provided for the purpose of enabling an observer to identify each of the colored sections which are visible in each sight window.

As previously referred to the instrument is fitted with an obturator strip 9 which can be moved linearly in front of the tape to obscure partly the endmost right hand color section, this obturator being linearly movable by means of the stylus as in the case of the colored tapes.

Assuming the instrument is to be used in an industrial concern, for example, a works turning out machined components, each type of component will be given a part number which will be entered on the card on the left hand of the instrument, together with a description of the component, the material of which the component is made and the number of components per set. It may be convenient for each unit graduation of the standard scales to represent say ten sets of each particular component. This is set out on the master scale card 40 which is inserted in guides provided at the top of the casing, in which position it is in juxtaposition to and alignment with the topmost standard scale thereby becoming directly related to this and all standard scales below it. The color chart on the right hand end of the instrument may, for example, indicate the material on order, stock in rough store, components in process and stock in finished store, this information being obtained respectively from the yellow, green, blue and red colored sections of the tape. If reference will now be made to the top bar in Figure 2 it will be observed that the position of component indicated in the upper line of the card on the left of the instrument is as follows: 800 components (or the material for 800) have been ordered from suppliers, of these 785 have been received from suppliers and entered in rough store. Of these 350 have been drawn from rough store for processing in the factory and 200 of these have been finished in the factory and entered into the finished component store ready for assembly or delivery. By reading the actual length of each color strip against the scale it will be seen that 200 sets are in the finished store whilst 150 sets are in course of processing, 375 are at present in the rough store and a further 15 sets are still to be received from suppliers against outstanding orders. It will be appreciated, therefore, that the progress of work relative to any particular component can readily be ascertained from a visual inspection of the bar chart and as work proceeds from day to day the various tapes can be moved linearly to a fresh position to indicate how the work is progressing on any particular component. For the purpose of facilitating reading the chart a standard scale is marked on the front of the moulded guide members which appear in the sight window or windows these standard scales corresponding with the direct reading master scale which is readily removable and replaceable to suit particular circumstances. The tapes preferably have a matt surface so that they can be easily read from any angle without light reflection interfering, whilst the division of the standard scale into 100 divisions is a feature of importance, thus enabling percentages and decimalisation to be shown and also units of quantity, etc. On time basis the scale allows of three months by days or two years by working weeks to be conveniently shown. For continuous control purposes, for example, continuous stock control, the advantage of the instrument is that it is just as easy to make deductions as to make additions. Thus the bars can be maintained from a common datum, although that datum may in itself be variable. This ensures rapid comparison of many bars and the picking out of danger stops with facility. Consider, for example, that the illustration cited above is applied to the continuous control of components in constant production. When, in such an application, finished components are withdrawn from the finished store they then pass outside the purview of this particular chart. With hand drawn bar charts this situation can only be indicated by blanking out or blacking over a corresponding length of the bar from zero. This procedure has two serious disadvantages: (a) the effective datum point of the bar is advanced from zero and, since the degree of advancement will vary between the bars it is no longer possible to compare so readily the relative positions of different components, and (b) since the datum is constantly advancing away from zero and further components are constantly being ordered and thus coming under review, either the length available for the progression of the bars must be disproportionately great or new charts must be prepared with undue frequency. This invention overcomes these disadvantages of hand drawn bar charts for, reverting to the illustration, if 100 units are now withdrawn from the finished store the changed situation is readily portrayed by regressing the indicated points on the bar by 100 so that they will then read 700, 685, 250 and 100 respectively. Thus all bars still read from zero datum and remain directly comparative at sight and the chart may be permanently maintained without undue length being necessary. The whole instrument can be made in quite a compact form and is preferably intended to be mounted in position upon a wall or other vertical supporting surface so that it can be easily read from a distance.

What I claim is:

1. An indicator comprising a casing having at least one slot-like sight window, rollers journalled in said casing adjacent the ends of said window, a fixed scale on said casing adjacent said window and longitudinally thereof, a plurality of individually linearly movable and individually identified endless tapes trained around said rollers to be observable through said window and movable longitudinally thereof to give in conjunction with the scale an indication of each detail of information sought, each tape being divided into two or more sections which are differently colored or marked for differentiation, a plurality of floating links having oppositely disposed parallel rollers, each tape being in the form of a series of closed loops respectively threaded around said link rollers and connected in end-to-end relation by said links to form said endless tapes, and means for linearly moving either tape or laterally displacing the floating link connections relative to the fixed scale to expose a predetermined length of identified tape section.

2. An indicator as claimed in claim 1 having means for selectively locking the tapes against linear movement.

3. An indicator as claimed in claim 2, wherein said locking means includes means for locking the tapes against individual or collective linear movement while permitting lateral displacement of the associated floating link connection or connections.

4. An indicator as claimed in claim 1 including a series of parallel slot-like windows arranged one above the other and each exposing two tapes each tape being divided up into individually identified sections, the casing at the end of each window carrying an index key to indicate what information the effective length of each section visible through the window is intended to give in a pictorial manner.

5. An indicator as claimed in claim 1 including a plurality of grooved moulded guides in which the tapes are mounted for linear travel, the tapes being individually movable from the front of the apparatus by a manually operable device inserted through the slot-like window and engageable with holes in eyelets secured to the tapes and with a projection on their connecting floating link.

6. An indicator as claimed in claim 1 including means for locking the tapes against linear and lateral displacement comprising tape gripping means for releasing said grip actuated by knobs on the front of the apparatus.

7. An indicator for the purpose of giving, pictorially, details of output or other information relating to a commercial, industrial or other concern, comprising a wall, a slot-like window in said wall, supports mounted on said wall adjacent the ends of said window, a plurality of endless flexible tapes disposed behind said window and trained around said supports, a plurality of floating links having parallel bearing portions, said tapes being in the form of elongated closed loops respectively threaded around said link bearing portions and connected in end-to-end relation by said links to form said endless tapes, markings on the surface of the tapes to be exposed through said window, means for moving each tape behind the window and around the bearing portions of the floating links at its ends, and a fixed scale formed on the wall adjacent said window to register with the various exposed marked lengths of the tape.

8. An indicator as claimed in claim 7, wherein said supports comprise rollers, the endless tapes extending around the rollers to allow linear movement of the tapes as a whole past the window.

9. An indicator for giving, pictorially, details of output or other information relating to a commercial, industrial or other concern, including a support, an elongated window formed in said support, a pair of elongated closed loops of tape markings on said tapes, a plurality of rollers mounted for rotation on said support at each end of the window, and a pair of floating links, each connecting together two ends of the elongated loops to connect said loops in end-to-end relation and form endless tapes, said endless tapes being disposed behind said window to exhibit said markings and trained about said rollers to be selectively moved linearly past the window together with the floating links and the tape of each loop to be individually moved around the end rollers and the floating links without altering the position of the floating links.

10. An indicator as claimed in claim 9, including manually operable means to lock one of the tapes at each end of the window to allow a combined linear movement of the floating links and movement of the unlocked portions of the tape loops.

11. An indicator as claimed in claim 9, including means for locking both tapes of one loop at one end of the window to allow movement of the other loop about its rollers.

12. An indicator as claimed in claim 9, including a cover slidable over all or part of the tape shown through the window.

GEORGE PERCIVAL SANDERSON.

REFERENCES CITED

The following references are of record in the file of this patent:

UNITED STATES PATENTS

| Number | Name | Date |
| --- | --- | --- |
| 1,623,216 | Szepesi | Apr. 5, 1927 |
| 1,711,981 | Andres et al. | May 7, 1929 |
| 1,740,978 | Goldsmith | Dec. 24, 1929 |
| 1,889,006 | Szepesi | Nov. 29, 1932 |
| 2,118,675 | Jackson | May 24, 1938 |

FOREIGN PATENTS

| Number | Country | Date |
| --- | --- | --- |
| 373,449 | Great Britain | May 26, 1932 |